United States Patent [19]

Fike

[11] Patent Number: 5,586,405
[45] Date of Patent: Dec. 24, 1996

[54] FISHING LURE

[76] Inventor: Jody R. Fike, 831 Jackson Ave., Monaca, Pa. 15061

[21] Appl. No.: 360,617

[22] Filed: Dec. 21, 1994

Related U.S. Application Data

[63] Continuation-in-part of Ser. No. 221,800, Apr. 1, 1994, abandoned.

[51] Int. Cl.$^6$ ..................................................... A01K 85/00
[52] U.S. Cl. ........................ 43/42.31; 43/42.24; 43/42.21
[58] Field of Search .............................. 43/42.24, 42.31, 43/42.39, 42.21, 42.2, 17.6

[56] References Cited

U.S. PATENT DOCUMENTS

| D. 259,504 | 6/1981 | Lott . |
| 804,206 | 11/1905 | Bruton . |
| 1,701,528 | 2/1929 | Clewell . |
| 2,617,228 | 11/1952 | Fasano et al. . |
| 2,665,516 | 1/1954 | Race . |
| 2,690,026 | 9/1954 | King . |
| 2,778,145 | 1/1957 | Momb . |
| 3,158,952 | 12/1964 | Creme . |
| 3,979,853 | 9/1976 | Storm et al. . |
| 4,416,080 | 11/1983 | Morrissette . |
| 4,823,497 | 4/1989 | Pierce . |
| 4,920,688 | 5/1990 | Devereaux . |
| 5,070,639 | 12/1991 | Pippert . |
| 5,119,581 | 6/1992 | Rudolph . |
| 5,121,567 | 6/1992 | Boone . |

FOREIGN PATENT DOCUMENTS

| 594616 | 3/1960 | Canada . |
| 612352 | 10/1926 | France . |

*Primary Examiner*—Kurt Rowan
*Attorney, Agent, or Firm*—Richard C. Litman

[57] ABSTRACT

A fishing lure particularly suited for top water fishing. The lure has a body of a spiral configuration having a concave recess formed longitudinally therealong, and a bulbous head. The body is formed from a buoyant material, such as a synthetic resin shell including a hollow center, or a synthetic resin foam. The combination of external body configuration and buoyancy enable the lure to float, and also to rotate when drawn along the water surface either slowly or quickly. Hooks are supported from loops formed in a wire which is embedded in the body, and exposes only the loops. The lure is fitted in conventional fashion with treble hooks and a swivel.

3 Claims, 1 Drawing Sheet

FISHING LURE

REFERENCE TO RELATED APPLICATION

This application is a continuation-in-part of Ser. No. 08/221,800, filed Apr. 1, 1994, now abandoned.

BACKGROUND OF THE INVENTION

1. Field of the Invention

The present invention relates to an improved fishing lure, in particular for use in top water fishing.

2. Description of the Prior Art

As the name suggests, fishing lures are designed to entice fish. For this purpose, they are generally designed to intrigue the eyes and/or ears of the desired fish. For instance, lures that rotate, swirl, or undulate, in order to attract the attention and interest of a fish, are known in the prior art. Often these lures are visually utilitarian and, although of some effectiveness, lack any additional enticing characteristics.

Of the numerous patents that have issued related to rotating lures, many disclose a spiral configuration. For instance, U.S. Pat. No. 1,701,528, issued to Robert L. Clewell on Feb. 12, 1929, describes a lure having a spiral body, a head connected to the body by a swivel fitting, and three treble hooks attached to a wire embedded within the body where the wire is exposed and forms loops. Also, U.S. Pat. No. 804,206, issued to George Bruton on Nov. 14, 1905, shows a baitless hook, having a spiral body portion and optional swivel device, which revolves in the water. Other patents that use a spiral or curved body and a swivel device to produce rotation in the water are U.S. Pat. No. 2,617,228, issued to Michael J. Fasano et al. on Nov. 11, 1952; U.S. Pat. No. 2,665,516, issued to Michael W. Race on Jan. 12, 1954; and U.S. Pat. No. 2,778,145, issued to Alvin K. Momb on Jan. 22, 1957. French Patent No. 612,352, issued to Charles-Auguste-Emile Frote on Jul. 31, 1926, also shows a spiral body.

Appeal to the piscine outlook is also attempted through the use of lures with undulating portions. For instance, U.S. Pat. No. 3,979,853, issued to William D. Storm et al. on Sep. 14, 1976, discloses a lure with an elongated, flexible, resilient streamer at the end of a rigid body. U.S. Pat. No. D259,504, issued to Paul C. Lott on Jun. 9, 1981, illustrates a serpentine lure with a flexible tail.

Appeals to multiple senses are attempted with some lures. For instance, U.S. Pat. No. 4,823,497, issued to Kevin W. Pierce on Apr. 25, 1989, discloses a lure that rattles, glows, and dispenses scent. The rattling is accomplished by a plurality of balls within the lure, while the light is generated by a replaceable chemical light tube. Although innovative, this lure does not have any full body rotational capability. Another lure, disclosed in U.S. Pat. No. 4,416,080, issued to Lawrence E. Morrissette on Nov. 22, 1983, also tries a combined appeal. The lure attempts to be visually interesting by rotating and sporting a metal overlay that glints in light. For aural interest, there are vibrations generated through the rotation of an inner metal part and through the interaction between the metal overlay and the main body. Again, however, the lure does not address the full range of possibilities. For instance, it does not attempt to mimic any real life being that a fish might recognize. Nor is the sound level it generates likely to be very high powered.

Finally, Canadian Patent No. 594,616, issued to Raymond O. Tibbets on Mar. 22, 1960, shows a lure that appeals to ear and eye, primarily with sliding and rotatably mounted beads. This lure does not, however, incorporate tantalizing features such as rotational capability.

The above cited prior art fails to disclose buoyant material for top water fishing, in combination with aspiralled body having an external recess promoting rotation when drawn along the water.

None of the above inventions and patents, taken either singly or in combination, is seen to describe the instant invention as claimed.

SUMMARY OF THE INVENTION

The present invention concerns an improved fishing lure particularly suited for top water fishing. The lure includes a generally spiral configuration, for causing the lure to rotate when drawn through the water, and also features buoyant construction. Thus, the lure will remain at the surface of water even when not being pulled therealong by the fisherman. This enables a user to use the lure most advantageously, in that a top water lure is held to be most effective if maintained motionless after casting, so that all surface ripples die away. After this period, which is frequently from thirty seconds to one minute, the lure may be pulled, and will commence to rotate.

Rotation is effectively imparted due to a concave recess extending longitudinally along the body. Because of the buoyancy, a little over half of the body is submerged in any one instant, and the recess promotes rotation more effectively than would be the case in the absence of this recess. Therefore, the combination of buoyancy and configuration for rotation do: not operate at cross purposes.

The novel lure also accommodates slow and rapid fishing styles, with reference to how fast the lure is drawn along by the user. When fish are reluctant to approach a baited hook, a slow pulling motion is employed. After the aforementioned delay for stilling the water, fish will be more apt to be caught.

At other times, when fish become aggressive, a quick pulling motion may be employed. In addition to lure body rotation, the disruption of the water entices the fish to bite. Thus, the present construction is usable for different fishing styles, as well as being effective when only partially submerged in the water.

Motions of the lure body and sounds arising therefrom are augmented by rattle chambers placed within the body. Two bores arranged at right angles each contain a sphere which creates a tapping sound as the body rotates.

Additional features further entice the attention of fish. A body of varying thickness, tapering from head to tail, is configured in a spiral shape so that the lure rotates when pulled through water. Atop the body is a slightly bulbous head, which connects via a securing loop to a swivel device. The head has two eyes, which may be colored beads or which may be molded and painted.

Treble hooks are secured along the body, either to eye-screws or to loop projections of a wire laced though the body. The tip of the tail of the lure may project up or down, depending on the particular motion desired.

The lure as a whole is rigid, and is preferably made from a hollow plastic body or from polyurethane foam. It may be decorated with various patterns and colors. It is coated with a finish, which may be iridescent or shiny.

Accordingly, it is a principal object of the invention to provide a top water fishing lure of noticeable thickness that mimics a snake and thus is attractive to fish.

It is another principal object of the invention to provide a rigid lure having a spiral configuration such that the lure rotates while being moved through the water.

It is also an object of the invention to provide a lure that generates enticing sounds, through internal rattle chambers containing spheres.

It is again an object of the invention to provide a lure which is advantageous for top water fishing.

An additional object of the invention is to provide a lure which accommodates different fishing styles for appealing to both reluctant and aggressive fish moods.

Another object of the invention is to provide a lure with treble hooks secured strategically along its body, either in eyelets or in loop projections of an internal wire.

Still another object of the invention is to provide a lure with a front swivel device to allow the lure to rotate without tangling its fishing line.

It is another object of the invention to provide a lure with a head that may be attached to the spiral body of the lure by a swivel device.

It is a further object of the invention to provide a lure made from a hollow plastic or polyurethane foam shell, so that the device is buoyant.

It is another object of the invention to provide a lure decorated with various colors and patterns.

Finally, it is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
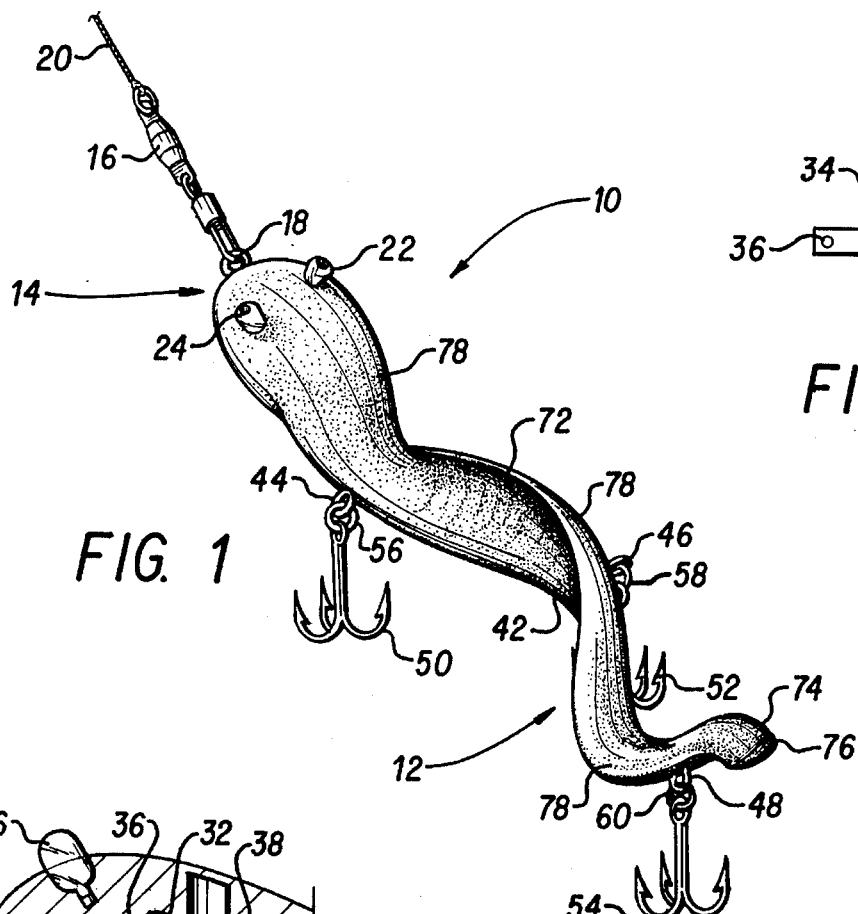
FIG. 1 is a perspective view of a fishing lure according to the present invention.

Referring now to FIG. 1, the present invention is a hard-bait fishing lure, generally designated 10, which is particularly adapted to attracting the close interest of surface feeding fish. It provides various features useful to the basic and efficient functioning of a lure.

The fishing lure 10 generally includes a body 12 and a head 14, both of rigid, buoyant construction. Suitable materials include, for example, synthetic resin either in solid form arranged to include a hollow core, or in the form of an open or closed cell foam.

Body 12 is not of mere uniform configuration, of sheet metal thickness, for example. Rather, to most accurately and effectively mimic the appearance of a living creature, the body 12 is of varying, tapering and substantial thickness. The head 14 is also of noticeable thickness. In the embodiment depicted in FIG. 1, head 14 is continuous with the body 12, where continuous is used to mean connecting without interruption or defined transition. In a second embodiment of the invention, not shown, head 14 is separate from body 12, and connects thereto by a swivel.

To attract attention, body 12 is permanently configured as a spiral. Thus, when moved through the water, the lure 10 rotates consistently and continually. This rotation is facilitated by a swivel device 16, such as a ball bearing swivel, which is attached to an eyescrew 18 at the front of the head 14, or, in the alternative embodiment described above, between body 12 and head 14. The swivel device allows the lure 10 to rotate without twisting or tangling a fishing line 20.

Figure 3:
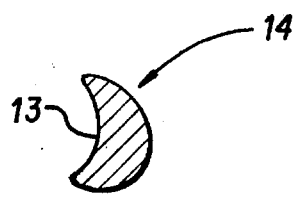
FIG. 3 is a cross sectional view of the body of the lure.

The spiralled body 12, which optimally includes just fewer than two full spirals or turns, also includes a concave relief 13 formed therein. This relief 13, better shown in the detail view of FIG. 3, extends the length of the body 12, and enables body 12 to rotate even when only half submerged in the water due to buoyancy.

The head 14 is also the site of two eyes 22 and 24. These eyes, which may be bright plastic beads integral and of contrasting color to the lure, serve to help attract attention.

Figure 5:
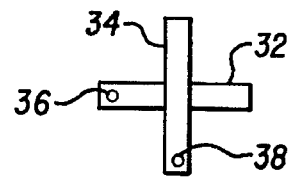
FIG. 5 is a diagrammatic representation of rattle chambers formed in the body.
Figure 2:
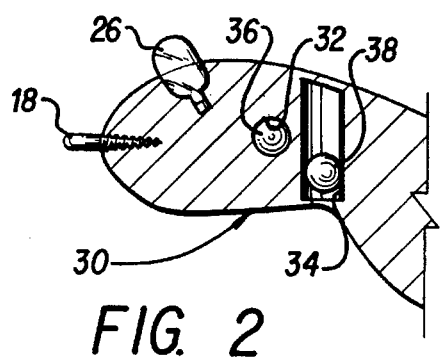
FIG. 2 is a cross sectional detail view of an embodiment of the head of the present invention showing inner rattle chambers and a front eyescrew.
Figure 4:
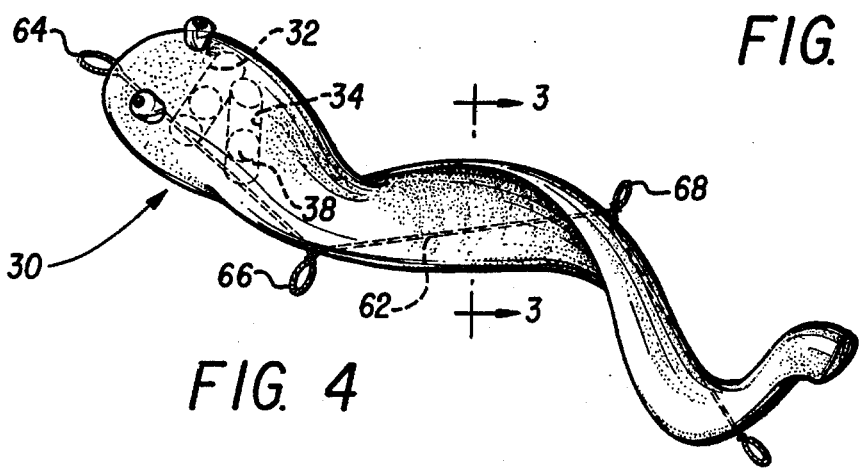
FIG. 4 is another perspective view of the present invention, with parts broken away to show interior detail, and showing an embodiment including inner rattle chambers and an embedded wire hook securing arrangement.

Another feature that will attract the attention of fish is an inner sound generating means. For example, referring to FIGS. 2 and 4, there is shown a rattle chamber arrangement 30. In the arrangement, two internal cylindrical hollow chambers 32 and 34 each contain a loose object, such as sphere 36 or 38, which rattle around and make noise when the lure 10 is in motion. The chambers 32,34 are oriented perpendicularly to one another, as shown in FIG. 5. This arrangement staggers and maximizes the number of impacts generated by a sphere 36 or 38 striking the end of its respective chamber 32 or 34 as the lure 10 rotates.

Again referring to FIG. 1, the outside of the lure 10 is decorated so as to increase its visual interest and resemblance to a snake. For further visual interest, as well as for protection, the lure is coated with a finish 42. The finish may be iridescent or plain.

The lure 10 also possesses various attributes useful to the basic and efficient functioning of a lure. Hook securing means, for example, are provided. FIG. 1 shows eyescrews 44, 46, and 48 embedded in the body of the lure 10. Companion treble hooks 50, 52, and 54 and split rings 56, 58, and 60 are also provided and shown. An alternative embodiment, shown in FIG. 4, employs a wire 62 embedded within the body 12 to project out and form hook securing loops 64, 66, 68, and 70.

Although many different arrangements of hook securing means and lengths of spirals are possible, the preferred embodiment thereof is shown in FIG. 1. The body completes slightly under two full spirals 72 and 74, on which are located three hook securing means. A first hook securing means 44 is placed proximate to the head 14, approximately a quarter of the way along the first spiral 72. A second hook securing means 46 is placed slightly before the beginning of the second spiral 74. A third hook securing means 48 is placed proximate to the tail end 76 of the body 12. All three of these hook securing means are located on the same surface 78, which would be the top of the snake if it were not spiralled.

It is to be understood that the present invention is not limited to the sole embodiment described above, but encompasses any and all embodiments within the scope of the following claims.

I claim:

1. A fishing lure for use in top water surface fishing, comprising:

a head having means for securing a swivel device thereto;

a tail end;

a rigid buoyant body extending along an axis joining said head and said tail end, said body having a cross section including a concave recess, said body twisting around said axis such that said concave recess forms a longitudinal spiral for allowing said lure to rotate when pulled along the water surface, said body tapering from said head to said tail end, said body including two perpendicular rattle chambers, each rattle chamber having a loose object therein; and securing means disposed along said body for attaching hooks to said body.

2. The lure according to claim 1, wherein said securing means comprise eyescrews secured to said body.

3. The lure according to claim 1 wherein said securing means comprise a wire embedded within said lure and extending exteriorly therefrom in loop projections along said body.

* * * * *